US008547591B2

United States Patent
Hasegawa

(10) Patent No.: US 8,547,591 B2
(45) Date of Patent: Oct. 1, 2013

(54) IMAGE PROCESSING APPARATUS AND PROGRAM FOR GENERATING SIZE-REDUCED IMAGE DATA WITH REDUCTION RATIO OF CHROMA COMPONENT GREATER THAN LUMINANCE COMPONENT

(75) Inventor: Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 190 days.

(21) Appl. No.: 12/956,765

(22) Filed: Nov. 30, 2010

(65) Prior Publication Data
US 2011/0128589 A1 Jun. 2, 2011

(30) Foreign Application Priority Data
Nov. 30, 2009 (JP) ................ 2009-272175

(51) Int. Cl.
H04N 1/21 (2006.01)
H04N 1/393 (2006.01)
H04N 1/64 (2006.01)
G06F 3/12 (2006.01)
G06K 15/02 (2006.01)

(52) U.S. Cl.
CPC ............ *G06F 3/122* (2013.01); *G06K 15/1843* (2013.01)
USPC ............................ 358/1.2; 358/1.16; 358/528

(58) Field of Classification Search
USPC ............... 358/1.2, 528, 451, 1.15, 1.16, 1.17, 358/403, 404, 444, 426.01, 426.02, 426.04, 358/426.05, 426.06, 518, 520, 539; 382/298, 382/299, 162, 166, 167, 232, 233, 234, 239, 382/244–250, 305
See application file for complete search history.

(56) References Cited

U.S. PATENT DOCUMENTS

| 5,285,290 | A | 2/1994 | Sakai et al. | |
|---|---|---|---|---|
| 5,930,397 | A * | 7/1999 | Tsujii et al. | 382/239 |
| 6,407,746 | B1 | 6/2002 | Tanizawa | |
| 6,553,143 | B2 * | 4/2003 | Miyake et al. | 382/239 |
| 6,553,153 | B1 * | 4/2003 | Cui | 382/298 |

(Continued)

FOREIGN PATENT DOCUMENTS

| JP | H02-039280 A | 2/1990 |
|---|---|---|
| JP | H04-017465 A | 1/1992 |

(Continued)

OTHER PUBLICATIONS

Japan Patent Office, Notification of Reason for Refusal for Japanese Patent Application No. 2009-272175 (counterpart to above-captioned patent application), dispatched Nov. 15, 2011.

(Continued)

*Primary Examiner* — Scott A Rogers
(74) *Attorney, Agent, or Firm* — Baker Botts L.L.P.

(57) ABSTRACT

An image processing apparatus performing image processing on image data stored in a temporary storage area, is provided. The image processing apparatus includes: a size-reducing unit that reduces a size of original image data, wherein the size of the original image data is reduced according to a parameter of the original image data such that a size-reduction ratio of a chroma component is greater than a size-reduction ratio of a luminance component, to perform the image processing; and a storage control unit that stores size-reduced image data in the temporary storage area to perform the image processing.

18 Claims, 11 Drawing Sheets

(56) References Cited

U.S. PATENT DOCUMENTS

| | | | |
|---|---|---|---|
| 6,628,827 B1* | 9/2003 | Acharya | 382/299 |
| 7,760,966 B2* | 7/2010 | Haukijarvi et al. | 382/298 |
| 8,169,544 B2* | 5/2012 | Kawaguchi | 382/298 |
| 2002/0047869 A1 | 4/2002 | Takiguchi | |
| 2003/0179389 A1* | 9/2003 | Kimura | 358/1.2 |
| 2004/0234164 A1 | 11/2004 | Kaji | |
| 2005/0062755 A1 | 3/2005 | Van Dyke et al. | |
| 2007/0122043 A1 | 5/2007 | Hasegawa et al. | |
| 2007/0248263 A1 | 10/2007 | Matsutani et al. | |
| 2007/0253626 A1* | 11/2007 | Jeffrey et al. | 382/232 |

FOREIGN PATENT DOCUMENTS

| | | |
|---|---|---|
| JP | H05-114996 A | 5/1993 |
| JP | H10-210501 A | 8/1998 |
| JP | 2001-326885 A | 11/2001 |
| JP | 2004-112068 A | 4/2004 |
| JP | 2004-158948 A | 6/2004 |
| JP | 2004-302563 A | 10/2004 |
| JP | 2005-092203 A | 4/2005 |
| JP | 2007-006194 A | 1/2007 |
| JP | 2007-156585 A | 6/2007 |

OTHER PUBLICATIONS

Japan Patent Office, extended European Search Report for European Patent Application No. 10252005.3 (counterpart to above-captioned patent application), dated Jan. 27, 2012.

Japan Patent Office, Decision of Refusal of Japanese Patent Application No. 2009-272175, dated Apr. 17, 2012. (counterpart to above-captioned U.S. patent application).

The State Intellectual Property Office of the People's Republic of China, Notification of First Office Action in counterpart Patent Application No. CN 201010572461.8, issued Mar. 25, 2013.

* cited by examiner

FIG. 2

| 51 | 52 | 53 | 54 | 55 |
|---|---|---|---|---|
| 0 | "IMG01.jpg" | 2954240 | 1600 | 1200 |
| 1 | "IMG02.jpg" | 1843200 | 2560 | 1920 |
| 2 | "IMG03.jpg" | 6017024 | 3264 | 2448 |
| 3 | "IMG04.jpg" | 4486144 | 1920 | 2560 |

31

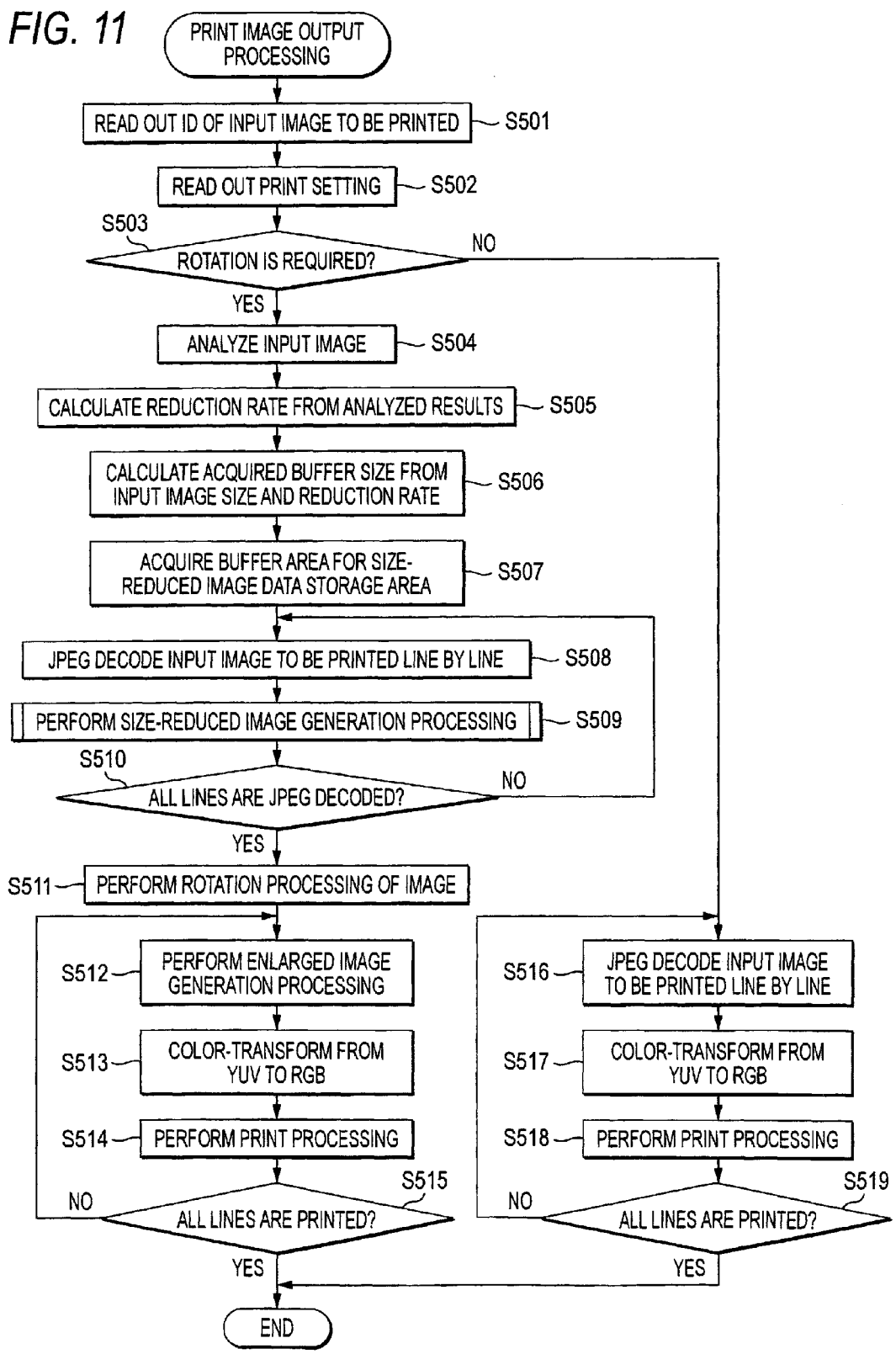

IMAGE PROCESSING APPARATUS AND PROGRAM FOR GENERATING SIZE-REDUCED IMAGE DATA WITH REDUCTION RATIO OF CHROMA COMPONENT GREATER THAN LUMINANCE COMPONENT

CROSS-REFERENCE TO RELATED APPLICATIONS

The present application claims priority from Japanese Patent Application No. 2009-272175 filed on Nov. 30, 2009, the disclosure of which is incorporated herein by reference in its entirety.

TECHNICAL FIELD

Aspects of the present invention relate to an image processing apparatus and program for performing image processing on image data.

BACKGROUND

There has been proposed a related-art image processing apparatus for performing image processing on stored image data.

The related-art image processing apparatus is configured to first store the image data for the image processing in a temporary storage area, and then perform the image processing on the image data stored in the temporary storage area. Here, the temporary storage area can be effectively used when reducing a size of the image data for the image processing before storage rather than when storing the image data in the temporary storage area without a change. However, the reduction of the size of the image data may lead to noticeable degradation in quality of image.

SUMMARY

Accordingly, it is an aspect of the present invention to provide an image processing apparatus and an image processing program which makes the degradation in quality of image caused by reducing the size of image data relatively unnoticeable and effectively use a temporary storage area for performing image processing on the image data.

According to an exemplary embodiment of the present invention, an image processing apparatus performing image processing on image data stored in a temporary storage area, comprising a size-reducing unit that reduces a size of original image data, wherein the size of the original image data is reduced according to a parameter of the original image data such that a size-reduction ratio of a chroma component is greater than a size-reduction ratio of a luminance component, to perform the image processing; and a storage control unit that stores size-reduced image data in the temporary storage area to perform the image processing.

A computer program for realizing the above-described image processing apparatus is also provided.

BRIEF DESCRIPTION OF DRAWINGS

FIG. 2 is an explanation view of an input image information storage area;

FIG. 11 is a flowchart of print image output processing of a second exemplary embodiment of the present invention.

DETAILED DESCRIPTION OF EXEMPLARY EMBODIMENTS

Hereinafter, reference will be made to exemplary embodiments of the present invention with reference to the accompanying drawings.

First Exemplary Embodiment

Hereinafter, a first exemplary embodiment of the present invention will be described.

[1-1. Overall Configuration]

Figure 1:
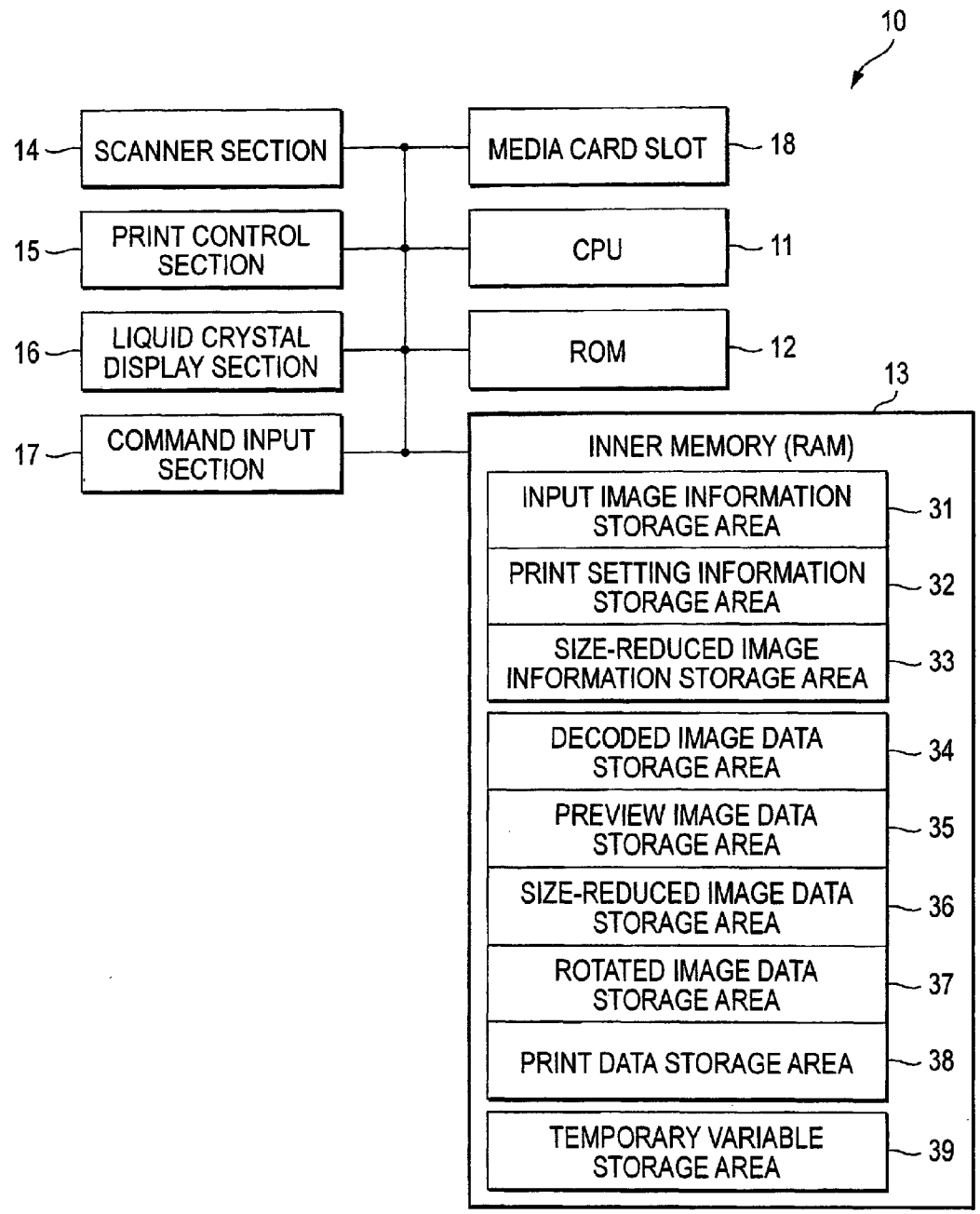
FIG. 1 is a block diagram showing schematic configuration of a combined machine of exemplary embodiments of the present invention.

FIG. 1 is a block diagram showing schematic configuration of a combined machine 10 as an image processing apparatus according to the first exemplary embodiment.

This combined machine 10 is a multi-functional apparatus having a scanner function, a copy function, etc. in addition to a printer function, and includes a central processing unit (CPU) 11, a read-only memory (ROM) 12, an inner memory (random access memory (RAM)) 13, a scanner section 14, a print control section 15, a liquid crystal display section 16, a command input section 17, and a media card slot 18, all of which are connected through signal lines.

The CPU 11 is a device for conducting all calculations at the combined machine 10.

The ROM 12 is a device in which programs for executing the following processing (FIGS. 6 through 9) on the CPU 11 are stored in advance.

The inner memory 13 is a device for temporally storing the results calculated by the CPU 11, input data, etc. A storage area of the inner memory 13 will be described afterwards in detail.

The print control section 15 is a device for printing image data to which a print command is issued, and can print a color image using cyan, magenta, yellow, and black (CMYK) inks.

The liquid crystal display section 16 is a device for displaying an image (including an image representing a sequence of letters such as a message) on a small color liquid crystal display.

The command input section 17 is a device in which a variety of keys configured to be pressed by a user are arranged, and which is used to input information based on the pressed key. In particular, the command input section 17 includes up, down, left, and right keys for inputting up, down, left, and right commands, and an OK key for inputting a decision command.

The media card slot 18 is configured to allow a media card (nonvolatile portable recording medium) such as a secure digital (SD) card or a compact flash (CF) card to be inserted. The combined machine 10 has a function (a so-called direct print function) of directly reading an image file (image data compressed in the JPEG format, in the present embodiment) out of the media card inserted in the media card slot 18, and then printing an image corresponding to the read image file.

[1-2. Storage Area of Inner Memory]

Next, the storage area of the inner memory 13 will be described.

As shown in FIG. 1, the inner memory 13 is provided with an input image information storage area 31, a print setting information storage area 32, a size-reduced image information storage area 33, a decoded image data storage area 34, a preview image data storage area 35, a size-reduced image data storage area 36, a rotated image data storage area 37, a print data storage area 38, and a temporary variable storage area 39, which are storage areas for storing various information.

The input image information storage area 31 is an area for storing information about an image file (hereinafter, referred to as "input image data") stored in the media card. Particularly, as shown in FIG. 2, the input image information storage area 31 includes an input image identification (ID) storage area 51, an input image file name storage area 52, an input image file size storage area 53, a transverse image size storage area 54, and a longitudinal image size storage area 55.

The input image ID storage area 51 is an area for storing ID of input image data (hereinafter, referred to as "input image ID") sequentially distributed from zero (0) corresponding to the number of image files (input image data) stored in the media card. In detail, the input image IDs are allocated to the input image data read out of the media card in that order.

The input image file name storage area 52 is an area for storing a file name of the image file stored in the media card. In detail, for example, character data (including character-free information) of 256 characters (1 character/bite) is stored in an area of 256 bites.

The input image file size storage area 53 is an area for storing a file size of the image file stored in the media card (a data size of input image data having a JPEG format) as a numerical value (in this example, a numerical value of a bite unit).

The transverse image size storage area 54 is an area for storing the transverse image size (pixel size) of an image (hereinafter, referred to as "input image") corresponding to the input image data as a numerical value (of a pixel unit).

The longitudinal image size storage area 55 is an area for storing the longitudinal image size of an input image as a numerical value (of a pixel unit).

Figure 3:
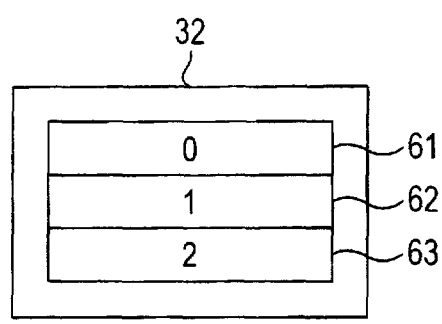
FIG. 3 is an explanation view of a print setting information storage area.

Returning to FIG. 1, the print setting information storage area 32 is an area for storing print setting that is set by a user. In detail, as shown in FIG. 3, the print setting information storage area 32 includes a print quality storage area 61, a sheet type storage area 62, and a sheet size storage area 63.

The print quality storage area 61 is an area for storing a type of print quality set by a user. In the present embodiment, there are stored numerical values which are made to correspond to two types of print qualities in advance (e.g. "0" for standard quality, and "1" for high quality).

The sheet type storage area 62 is an area for storing a type of sheet set by a user. In the present embodiment, there are stored numerical values which are made to correspond to three types of sheets in advance (e.g. "0" for a normal sheet, "1" for an inkjet sheet, "2" for a glossy sheet).

The sheet size storage area 63 is an area for storing a type of sheet size set by a user. In the present embodiment, there are stored numerical values which are made to correspond to three types of sheet sizes in advance (e.g. "0" for an L size, "1" for a 2L size, "2" for an A4 size).

Figure 4:
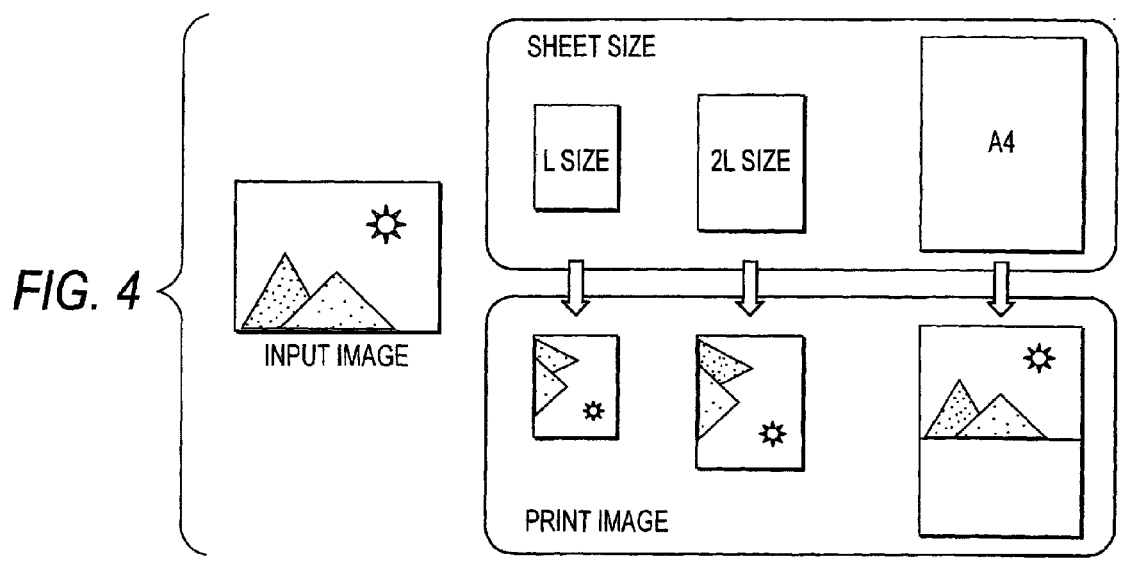
FIG. 4 is an explanation view of correspondence between a sheet size and the direction of a print image.

Here, a direction of an image to be printed is determined for each sheet size in advance. In detail, as shown in FIG. 4, a longitudinally long image is set to be printed on an L size sheet and a 2L size sheet, and a transversely long image is set to be printed on an A4 size sheet. Thus, in the case where printing the transversely long image on the L size sheet and the 2L size sheet, or in the case where printing the longitudinally long image on the A4 size sheet, image processing (rotation processing) of rotating the image at an angle of 90° is performed.

Figure 5:
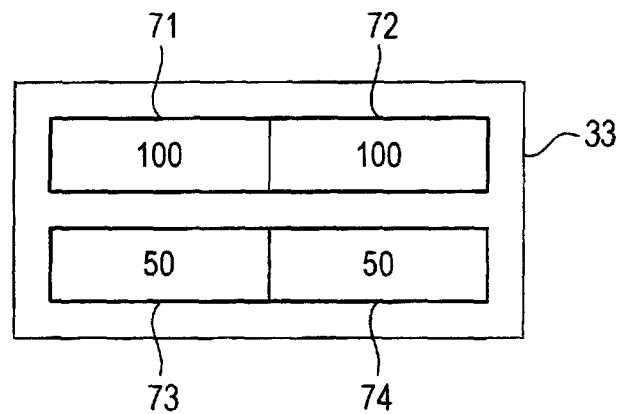
FIG. 5 is a explanation view of a size-reduced image information storage area.

Returning to FIG. 1, the size-reduced image information storage area 33 is an area for storing information about size-reduced image data as described below. In detail, as shown in FIG. 5, the size-reduced image information storage area 33 includes a luminance component transverse reduction rate storage area 71, a luminance component longitudinal reduction rate storage area 72, a chroma component transverse reduction rate storage area 73, and a chroma component longitudinal reduction rate storage area 74.

The luminance component transverse reduction rate storage area 71 is an area for storing, a reduction rate (%) of the luminance component in an image transverse direction relative to that of an original image, as a numerical value, and the luminance component longitudinal reduction rate storage area 72 is an area for storing a reduction rate (%) of the luminance component in an image longitudinal direction relative to that of the original image, as a numerical value. Similarly, the chroma component transverse reduction rate storage area 73 is an area for storing, a reduction rate (%) of a chroma component in an image transverse direction relative to that of the original image, as a numerical value, and the chroma component longitudinal reduction rate storage area 74 is an area for storing, a reduction rate (%) of the chroma component in an image longitudinal direction relative to that of the original image, as a numerical value.

Returning to FIG. 1, the decoded image data storage area 34 is an area for temporally storing decoded input image data (decoded data). In detail, as described below, decoded data of RGB or YUV is adapted to be stored by each line, and an area capable of storing data of at least 1 line, 1 plane is secured.

The preview image data storage area 35 is an area for temporally storing preview image data that converts (enlarges size of or reduces size of) the decoded data to the size of a predetermined preview image. That is, as described below, the combined machine 10 of the present embodiment is configured to display a preview image, by which the print image of an image corresponding to the input image data can be grasped, on the liquid crystal display section 16 so as to cause a user to select input image data, i.e. a target to be printed, from a plurality of input image data stored in the media card. The combined machine 10 of the present embodiment is configured to print an image corresponding to the input image data corresponding to the preview image selected by the user.

The size-reduced image data storage area 36 is an area for temporally storing size-reduced image data which is generated by reducing a size of the decoded data, and is secured as a storage area of a predetermined fixed size in the present embodiment. In detail, an area capable of storing an image of 2560×1920 (pixel), 1 plane is provided as a Y component storage area, and areas capable of storing an image of 1280× 960 (pixel), 1 plane are provided as a U component storage area and a V component storage area.

The rotated image data storage area 37 is an area for temporally storing a rotated image generated by rotating the size-reduced image.

The print data storage area 38 is an area for temporally storing image data (intermediate processed data for generating print data (raster data) and print data (raster data)) for print processing.

The temporary variable storage area 39 is an area for storing temporary information such as a variable, a counter, etc.

[1-3. Processing Executed by CPU]

Figure 6:
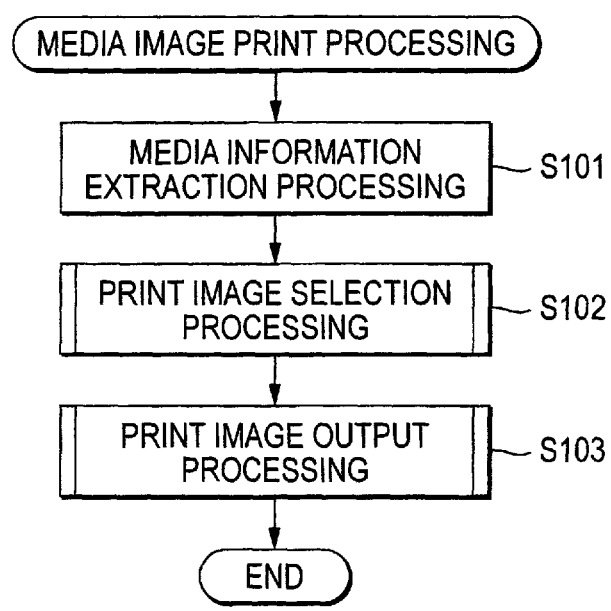
FIG. 6 is a flowchart of media image print processing of a first exemplary embodiment of the present invention.

Next, media image print processing executed by the CPU 11 of the combined machine 10 will be described by using a flowchart of FIG. 6. The media image print processing is executed by inputting a command for selecting a "media image print" mode by the command input section 17 in a state where the media card in which the image file is stored is inserted into the media card slot 18.

When the media image print processing has stared, first, in S101, the CPU 11 performs media information extraction processing of reading information (a file name, a file size, a transverse image size, and a longitudinal image size) out of each input image data stored in the media card, and then sequentially storing the information in the input image information storage area 31 (the input image file name storage area 52, the input image file size storage area 53, the transverse image size storage area 54, and the longitudinal image size storage area 55).

Continuously, in S102, print image selection processing of displaying the preview image, by which the print image of an image corresponding to the input image data can be grasped, on the liquid crystal display section 16, and thereby enabling a user to select the input image data, i.e. the target to be printed, is executed. The details of the print image selection processing will be described afterwards (FIG. 7).

Figure 8:
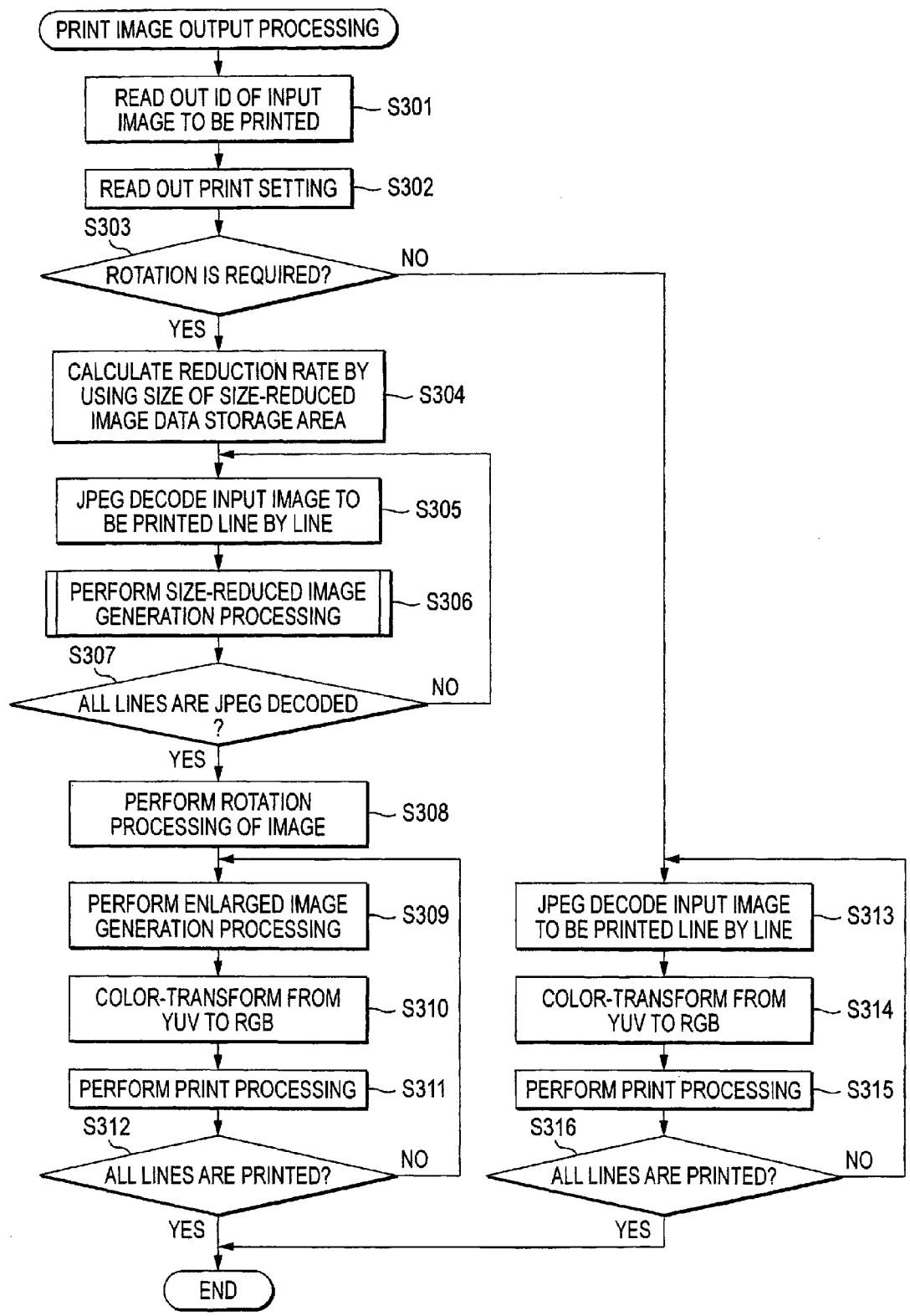
FIG. 8 is a flowchart of print image output processing of the first exemplary embodiment of the present invention.

Subsequently, in S103, print image output processing of printing the image corresponding to the image data, i.e. the target to be printed, selected in S102, is executed. After that, the media image print processing is ended. The details of the print image output processing will be described afterwards (FIG. 8).

Figure 7:
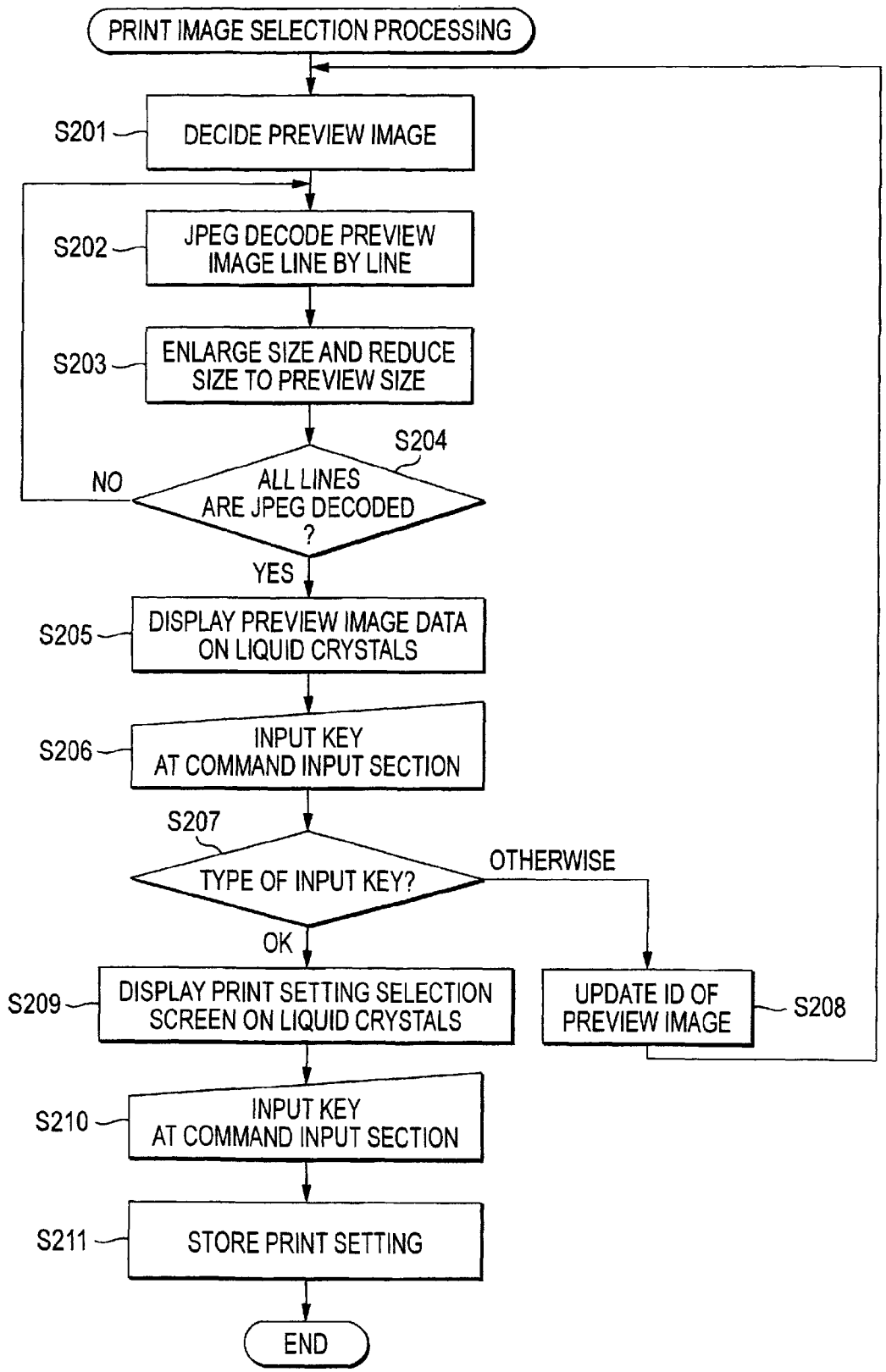
FIG. 7 is a flowchart of print image selection processing of the first exemplary embodiment of the present invention.

Next, the print image selection processing executed by the CPU 11, which is the processing executed in S102 in the media image print processing, is described using a flowchart of FIG. 7.

When the print image selection processing starts, the CPU 11 decides one input image data to be displayed as the preview image on the liquid crystal display section 16 among the input image data stored in the media card first in 201. That is, in the combined machine 10, only one preview image is displayed on the liquid crystal display section 16. By this configuration, the preview image is displayed on the liquid crystal display section 16 having a limited display size as large as possible. In detail, a preview ID counter having an initial value (i.e. a value when the media image print processing is started) of zero (0) is provided to the temporary variable storage area 39 in advance, and the input image data of an input image ID (value stored in the input image ID storage area 51) corresponding to the value of the preview ID counter is decided as the input image data corresponding to the preview image. Meanwhile, as described afterwards, the preview image displayed on the liquid crystal display section 16 is changed into that of another input image data in response to the pressing of the up, down, left, or right key of the command input section 17, and the input image data corresponding to the preview image displayed if the OK key is pressed is selected as a target to be printed.

Continuously, in S202, the input image data (image data compressed in the JPEG format) decided in S201 is decoded (decompressed), and decoded data are acquired in line sequence (i.e. in sequence, by each line). To store the decoded data, the decoded image data storage area 34 is used.

Subsequently, in S203, the input image data (decoded data) for 1 line which are decoded in S202 are reduced in size or enlarged in size by using a nearest neighbor method so as to obtain a size of the preview image (as a fixed size, 160×120 pixels in this embodiment), and are stored in the preview image data storage area 35.

Continuously, in S204, it is determined whether or not decode processing of all the lines of the input image data is completed. In detail, whenever the decode processing for 1 line is completed, one (1) is added to the value of a decoded-line number counter (its initial value is zero (0) if the decode processing is started) previously provided to the temporary variable storage area 39, and it is determined whether or not the resultant value reaches the number of lines of the input image data. Thereby, it is determined whether or not the decode processing is completed.

In S204, if it is determined that the decode processing of all the lines of the input image data is not completed, the processing returns to S202.

Meanwhile, if it is determined that the decode processing of all the lines of the input image data is completed in S204, the processing proceeds to S205, and the image (preview image) corresponding to the preview image data stored in the preview image data storage area 35 is displayed on the liquid crystal display section 16.

Continuously, in S206, the information about a command key pressed at the command input section 17 by a user is input.

Subsequently, in S207, it is determined on the basis of the information input in S206 whether the pressed key is an OK key or another key (particularly, an up, down, left, or right key).

In S207, if it is determined that the pressed key is a key other than the OK key, the processing proceeds to S208, and the value of a preview ID counter is updated. In detail, if the pressed key is the down or right key, one (1) is added to the value of the preview ID counter in order to change the input image data corresponding to the preview image into the input image data having a value of the input image ID which is greater by 1. Meanwhile, if the pressed key is the up or left key, one (1) is subtracted from the value of the preview ID counter in order to change the input image data corresponding to the preview image into the input image data having a value of the input image ID which is smaller by 1. After S208 is processed, the processing returns to S201. Thus, the preview image displayed on the liquid crystal display section 16 is changed into that of another input image data. However, as a result of the calculating (adding or subtracting), if the value of the preview ID counter exceeds a range of the values of the input image ID (i.e. from 0 to "the number of files stored in the media card minus 1"), the value is maintained without being calculated. Further, in this case, since the preview image displayed on the liquid crystal display section 16 is not changed, the processing may return to S206 without returning to S201.

Meanwhile, if it is determined that the pressed key is the OK key in S207, i.e. if the input image data corresponding to the preview image displayed at this point of time is selected as the target to be printed, the processing proceeds to S209, and a print setting selection screen for causing a user to perform print setting is displayed on liquid crystal display section 16. In detail, in connection with three setting items of print quality, sheet type, and sheet size, options of two types of standard quality and high quality for the print quality, options of three types of normal sheet, inkjet sheet, and glossy sheet for the sheet type, and options of three types of L size, 2L size, and A4 size for the sheet size are displayed so as to be able to be selected at the command input section 17.

Continuously, in S210, with respect to the print setting selection screen displayed in S209, the information about the command key pressed (selected) at the command input section 17 by a user is input.

Subsequently, in S211, on the basis of the information input in S210, the print setting (print quality, sheet type, and sheet size) made by the user is stored in the print setting information storage area 32 (the print quality storage area 61, the sheet type storage area 62, and the sheet size storage area 63). After that, the print image selection processing is ended.

Next, the print image output processing executed by the CPU 11 as the processing of S103 in the aforementioned media image print processing will be described using a flowchart of FIG. 8.

When the print image output processing has started, first, in S301, the CPU 11 reads out the input image ID (the value of the preview ID counter) of the input image data selected as the target to be printed.

Subsequently, in S302, the print setting stored in the print setting information storage area 32 is read out.

Subsequently, in S303, it is determined from the sheet size of the print setting and the direction of the input image corresponding to the input image data, i.e. the target to be printed, whether or not the rotation processing for rotating the input image at an angle of 90° is required. In detail, as already described, the sheet size and the direction of the image (long in a longitudinal or transverse direction) are made to correspond in advance (FIG. 4), and in the case where a direction of the image corresponding to the sheet size is different from the direction of the input image, it is determined that the rotation processing is required. In the case where the direction of the image corresponding to the sheet size is same as the direction of the input image, it is determined that the rotation processing is not required. Further, it is specifically determined on the basis of values of the transverse image size storage area 54 and the longitudinal image size storage area 55 whether the input image is long in the longitudinal or transverse direction.

If it is determined in S303 that the rotation processing is required, the processing proceeds to S304, a reduction rate of the input image is decided corresponding to a size (fixed buffer size) of the size-reduced image data storage area 36.

A method of deciding the reduction rate in S304 is described in detail. Further, in the following description, "Xin," and "Yin" refer to respective transverse and longitudinal image sizes (pixels) of the input image, "InImgSize" refers to an image size (pixel) of the input image, wherein InImgSize=Xin×Yin. Further, "InDataSize" refers to a data size (bite) of the input image data. In this embodiment, since 1 pixel of each plane is expressed by 1 bite (256 tones), it can be expressed that InDataSize=Xin×Yin×3. Also, "YDataSize" refers to a data size of the luminance component after size-reduction, and "CDDataSize" refers to a data size of the chroma component (U+V) after size-reduction. In the present embodiment, it is assumed that the data sizes of the U component and the V component are identical to each other (i.e. CDDataSize/2). Further, "Xy," and "Yy" refer to respective transverse and longitudinal image sizes (pixels) of the luminance component after size-reduction, wherein YDataSize=Xy×Yy. Further, "RotBuffSize" refers to a size (bite) of the size-reduced image data storage area 36, "YBuffSize" refers to a size (bite) of the luminance component storage area (Y component storage area) in the size-reduced image data storage area 36, "CDBuffSize" refers to a size (bite) of the chroma component storage area (U component storage area+V component storage area) in the size-reduced image data storage area 36. The RotBuffSize is divided into a total of three areas, one of which is the area of the YBuffSize, and the other two are the areas of the CDBuffSize, and in which respective size-reduced image data of Y, U and V are stored. Further, "ScaleY" refers to a reduction rate (%) of the luminance component relative to the original image, and "ScaleY_X" refers to a reduction rate (%) of the luminance component in the image transverse direction relative to that of the original image, "ScaleY_Y" refers to a reduction rate (%) of the luminance component in the image longitudinal direction relative to that of the original image. In addition, "ScaleCD" refers to a reduction rate (%) of the chroma component relative to that of the original image, "ScaleCD_X" refers to a reduction rate (%) of the chroma component in an image transverse direction relative to that of the original image, and "ScaleCD_Y" refers to a reduction rate (%) of the chroma component in an image longitudinal direction relative to that of the original image. Further, in the present embodiment, the reduction rate in the image longitudinal direction is equal to the reduction rate in the image transverse direction.

Further, the image transverse and longitudinal reduction rates ScaleY_X, ScaleY_Y, ScaleCD_X, and ScaleCD_Y of the luminance component and the chroma component which are decided in the processing of S304 are stored in the respective areas of the size-reduced image information storage area 33 (the luminance component transverse reduction rate storage area 71, the luminance component longitudinal reduction rate storage area 72, the chroma component transverse reduction rate storage area 73, and the chroma component longitudinal reduction rate storage area 74), and the other calculating variables are stored in the temporary variable storage area 39.

Further, in the present embodiment, the maximum ratio of the data size of the luminance component Y to each of the data sizes of the chroma components U and V is set to 4:1 (each of the image transverse direction and longitudinal direction data sizes is set to 2:1). That is, the reduction ratio of each component is decided such that a ratio of the data size YDataSize of the luminance component after size-reduction to the data size CDDataSize of the chroma component after size-reduction does not exceed 2:1. This ratio is a reduction rate for making the size of the image data as small as possible without making the degradation of the image quality easily noticed, and is a value obtained experimentally. This ratio is merely taken by way of an example, and thus the present embodiment is not limited to this ratio.

In the processing of S304, the reduction rate of the input image is calculated for the following cases (A) through (C).

(A) RotBuffSize≥InDataSize

In this case, the input image data can be stored in the size-reduced image data storage area 36 without reducing the size thereof. Thus, both the ScaleY and the ScaleCD are 100%, and further, all of the ScaleY_X, ScaleY_Y, ScaleCD_X, and ScaleCD_Y are 100%.

(B) InDataSize/2≤RotBuffSize<InDataSize

In this case, the size of the input image data can be stored in the size-reduced image data storage area 36 by reducing the size of only the chroma component without reducing the size of the luminance component of the input image data. Thus, all of the ScaleY, ScaleY_X, and ScaleY_Y are 100%.

Meanwhile, the CDBuffSize is expressed below by Expression 1.

$$CDBuffSize = RotBuffSize - YBuffSize \quad \text{[Expression 1]}$$

The YBuffSize and the CDBuffSize are expressed as in Expressions 2 and 3 below.

$$YBuffSize = YDataSize = InImgSize \quad \text{[Expression 2]}$$

$$CDBuffSize = CDDataSize \quad \text{[Expression 3]}$$

Further, the ScaleCD is expressed below in Expression 4.

$$ScaleCD = \frac{CDDataSize/2}{InImgSize} \times 100 = \frac{CDDataSize}{2 \times InImgSize} \times 100 \quad \text{[Expression 4]}$$

From Expressions 1 through 4 above, the ScaleCD is expressed below by Expression 5.

$$ScaleCD = \frac{RotBuffSize - InImgSize}{2 \times InImgSize} \times 100 \quad \text{[Expression 5]}$$

Further, in the present embodiment, since the transverse and longitudinal reduction rates are equal to each other, the ScaleCD_X and the ScaleCD_Y are expressed below by Expression 6.

$$\begin{aligned} ScaleCD\_X &= ScaleCD\_Y \\ &= \sqrt{ScaleCD/100} \times 100 \\ &= \sqrt{\frac{RotBuffSize - InImgSize}{2 \times InImgSize}} \times 100 \end{aligned} \quad \text{[Expression 6]}$$

(C) RotBuffSize ≤ InDataSize/2

In this case, the size of the chroma component of the input image data is requires to be reduced as well as the size of the luminance component. In detail, to make a size-reduction ratio of the luminance component as small as possible, the ratio of the YDataSize to the CDDataSize is maintained to be 2:1.

The CDDataSize and the CDBuffSize are expressed below in Expressions 7 and 8, respectively.

$$CDDataSize = \frac{YDataSize}{2} \quad \text{[Expression 7]}$$

$$CDBuffSize = \frac{CDDataSize}{YDataSize + CDDatasize} \cdot RotBuffSize \quad \text{[Expression 8]}$$

From Expressions 7 and 8 as described above, the CDBuffSize is expressed below in Expression 9.

$$\begin{aligned} CDBuffSize &= \left( \frac{YDataSize/2}{YDataSize + YDataSize/2} \right) \times RotBuffSize \\ &= \frac{1}{3} \cdot RotBuffSize \end{aligned} \quad \text{[Expression 9]}$$

Similarly, from Expression 7 as described above and Expression 10 as described below, the YBuffSize is expressed below in Expression 11.

$$YBuffSize = \frac{YDataSize}{YDataSize + CDDatasize} \cdot RotBuffSize \quad \text{[Expression 10]}$$

$$\begin{aligned} YBuffSize &= \left( \frac{YDataSize}{YDataSize + YDataSize/2} \right) \times RotBuffSize \\ &= \frac{2}{3} \cdot RotBuffSize \end{aligned} \quad \text{[Expression 11]}$$

Meanwhile, since each of the data sizes of the luminance component and the chroma component is decided corresponding to the size of the storage area, the YDataSize and the CDDataSize are expressed below in Expressions 12 and 13.

$$YDataSize = YBuffSize \quad \text{[Expression 12]}$$

$$CDDataSize = CDBuffSize \quad \text{[Expression 13]}$$

Further, the ScaleCD is expressed below in Expression 14.

$$\begin{aligned} ScaleCD &= \frac{CDDataSize/2}{InImgSize} \times 100 \\ &= \frac{CDDataSize}{2 \times InImgSize} \times 100 \end{aligned} \quad \text{[Expression 14]}$$

From Expressions 9, 12, 13 and 14, the ScaleCD is expressed below in Expression 15.

$$\begin{aligned} ScaleCD &= \frac{\frac{1}{3} \times RotBuffSize}{2 \times InImgSize} \times 100 \\ &= \frac{1}{6} \times \frac{RotBuffSize}{InImgSize} \times 100 \end{aligned} \quad \text{[Expression 15]}$$

Further, in the present embodiment, since the transverse and longitudinal reduction rates are equal to each other, the ScaleCD_X and the ScaleCD_Y are expressed below by Expression 16.

$$\begin{aligned} ScaleCD\_X &= ScaleCD\_Y \\ &= \sqrt{ScaleCD/100} \times 100 \\ &= \sqrt{\frac{1}{6} \times \frac{RotBuffSize}{InImgSize}} \times 100. \end{aligned} \quad \text{[Expression 16]}$$

Similarly, the ScaleY is expressed below in Expression 17. From Expressions 11 through 13 as described above and Expression 17 as described below, the ScaleY is expressed below by Expression 18. Further, in the present embodiment, since the transverse and longitudinal reduction rates are equal to each other, the ScaleY_X and ScaleY_Y are expressed below by Expression 19.

$$ScaleY = \frac{YDataSize}{InImgSize} \times 100 \quad \text{[Expression 17]}$$

$$\begin{aligned} ScaleY &= \frac{\frac{2}{3} \times RotBuffSize}{InImgSize} \times 100 \\ &= \frac{2}{3} \times \frac{RotBuffSize}{InImgSize} \times 100 \end{aligned} \quad \text{[Expression 18]}$$

-continued $$\begin{aligned} ScaleY\_X = ScaleY\_Y &= \sqrt{ScaleY/100} \times 100 \\ &= \sqrt{\frac{2}{3} \times \frac{RotBuffSize}{InImgSize}} \times 100 \end{aligned}$$ [Expression 19]

As described above, after the reduction rate of the input image is decided in the processing of S304, the processing proceeds to S305. In S305, the input image data selected by a user is decoded (decompressed), and the decoded data are acquired in line sequence, in 1 plane 1 line. At this time, the decoded image data storage area 34 is used for the storage of the decoded data.

Figure 9:
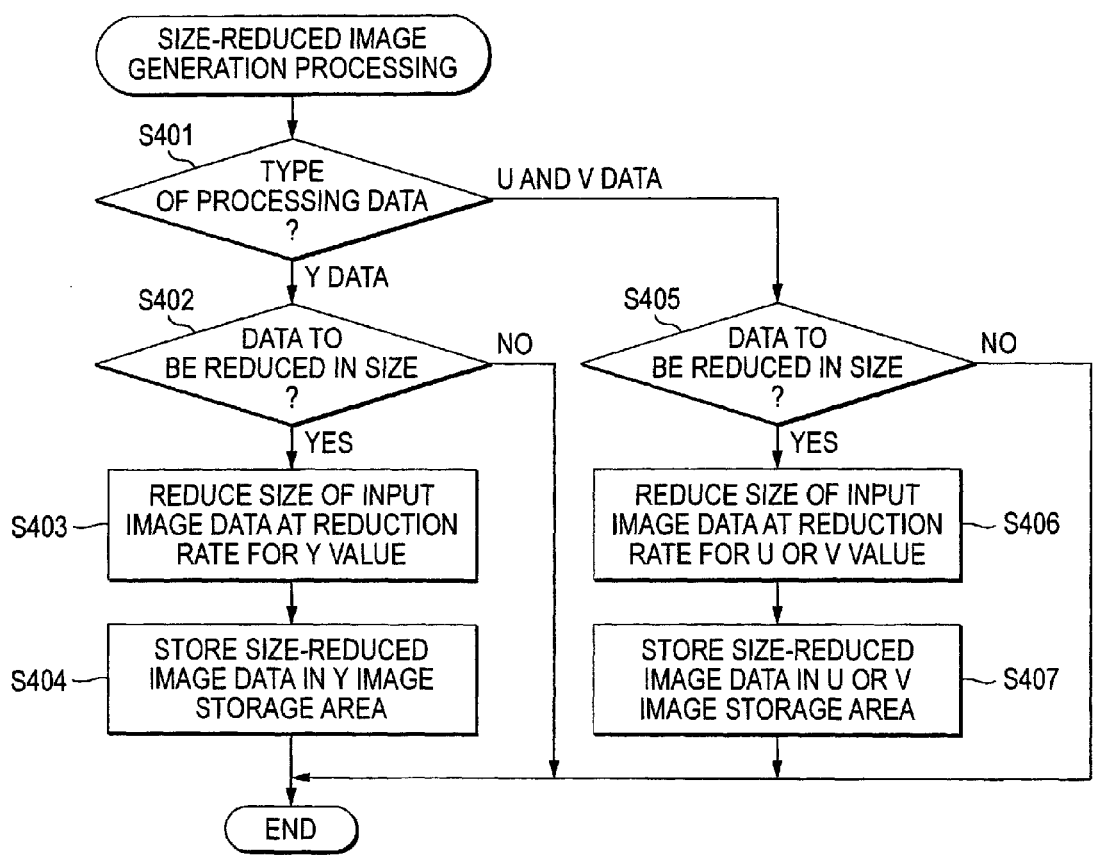
FIG. 9 is a flowchart of size-reduced image generation processing of the first exemplary embodiment of the present invention.

Continuously, in S306, size-reduced image generation processing of, reducing the size of the image data for 1 plane 1 line decoded in S305 using the reduction rate obtained in S304, and storing them in the size-reduction image data storage area 36, is executed. The details of the size-reduction image generation processing will be described afterwards (FIG. 9).

Subsequently, in S307, it is determined whether or not decode processing of all the lines of the input image data is completed. In detail, whenever the decode processing for 1 plane 1 line is completed, one (1) is added to the value of a decoded-line number counter (its initial value is zero (0) when the decode processing is started) provided to the temporary variable storage area 39 in advance, and it is determined whether or not the resultant value reaches the product of the number of lines of the input image data by three planes. Thereby, it is determined whether or not the decode processing is completed.

In S307, if it is determined that the decode processing of all the lines of the input image data is not completed, the processing returns to S305.

Meanwhile, if it is determined that the decode processing of all the lines of the input image data is completed in S307, the processing proceeds to S308, and the image processing (rotation processing) of rotating the input image at an angle of 90° is executed. In detail, each pixel value of the input image stored in the size-reduced image data storage area 36 is stored at a post-rotation coordinate location of the rotated image data storage area 37. Further, in the present embodiment, the input image data undergoing the rotation processing is stored in the rotated image data storage area 37 first, and then is stored in the print data storage area 38 as described afterwards. However, the input image data may be directly stored in the print data storage area 38.

Continuously, in S309, with respect to the data for 1 line among the input image data stored in the rotated image data storage area 37, its chroma components U and V are enlarged using a nearest neighbor method such that the image sizes (pixel sizes) of the chroma components U and V are equal to the image size of its luminance component Y, and are stored in the print data storage area 38. Further, in the aforementioned case (A), since the image size of the luminance component Y is equal to those of the chroma components U and V, the enlargement processing is not required.

Subsequently, in S310, the image stored in the print data storage area 38 is color-transformed from YUV to RGB in unit of pixel, and a pixel value after the transformation is overwritten on the print data storage area 38. The transformation from YUV to RGB may be carried out according to Expressions below.

$R = 1.000Y + 1.402V$ $G = 1.000Y - 0.344U - 0.714V$ $B = 1.000Y + 1.772U$

The Expressions described above are inverse transform expressions of Expressions (transformation from YUV to RGB) described below.

$Y = 0.299R + 0.587G + 0.114B$ $U = -0.169R - 0.331G + 0.500B$ $V = 0.500R - 0.419G - 0.081B$

Continuously, in S311, print processing of the input image data for 1 line stored in the print data storage area 38 is executed. In this print processing, the input image data for 1 line stored in the print data storage area 38 are subjected to color transformation (from RGB to CMYK) and binarization, and then are output to the print control section 15. Thus, the printing based on binary data is carried out at the print control section 15.

Subsequently, in S312, it is determined whether or not the print processing of all the lines of the input image data after the rotation processing is completed. In detail, whenever the print processing for 1 line is completed, one (1) is added to the value of a printed-line number counter (its initial value is zero (0) when the print processing is started) previously provided to the temporary variable storage area 39, and it is determined whether or not the resultant value reaches the number of lines of the input image after the rotation processing. Thereby, it is determined whether or not the print processing is completed.

If it is determined that the print processing of all the lines of the input image data is not completed in S312, the processing returns to S309.

In contrast, if it is determined that the print processing of all the lines of the input image data is completed in S312, the print image output processing is ended.

Further, if it is determined that the rotation processing is not required in S303 as described above, the processing proceeds to S313. The input image data selected by a user is decoded (decompressed), and the decoded data is acquired in line sequence. At this time, the decoded image data storage area 34 is used for the storage of the decoded data, and the input image data after being decoded is copied into the print data storage area 38.

Continuously, in S314, like the aforementioned S310, the image stored in the print data storage area 38 is color-transformed from YUV to RGB in unit of pixel.

Then, in S315, like the aforementioned S311, print processing of the input image data for 1 line stored in the print data storage area 38 is executed.

Subsequently, in S316, it is determined whether or not the print processing of all the lines of the input image data is completed. In detail, whenever the print processing for 1 line is completed, one (1) is added to the value of a printed-line number counter (its initial value is zero (0) when the print processing is started) provided to the temporary variable storage area 39 in advance and it is determined whether or not the resultant value reaches the number of lines of the input image. Thereby, it is determined whether or not the print processing is completed.

If it is determined that the print processing of all the lines of the input image data is not completed in S316, the processing returns to S313.

In contrast, if it is determined that the print processing of all the lines of the input image data is completed in S316, the print image output processing is ended.

Next, the size-reduced image generation processing executed by the CPU 11 as the processing of S306 in the aforementioned print image output processing will be described using a flowchart of FIG. 9.

When starting the size-reduced image generation processing, first, in S401, the CPU 11 determines which one of Y, U, and V data the type of currently processing data belongs to. Further, when the image data compressed in the JPEG format are decoded, the decoded data are generated in the order of Y, U, and V, so that the type of data can be determined by counting the order.

If it is determined in S401 that the type of currently processing data belongs to the Y data, the proceeding proceeds to S402, and it is determined whether or not the currently processing data (Y data) is data to be reduced in size. In detail, if the condition of Expression 20 described below is met, the data is determined to be reduced in size. Otherwise, the data is determined not to be reduced in size. Further, in Expression 20 below, ScaleY_Y is the reduction rate of the image longitudinal direction of the luminance component stored (obtained in S304) in the size-reduced image information storage area 33, MinLineCountY is a line counter of the size-reduced image of the luminance component Y, and InCount is the line counter of the input image. In other words, processing of extracting the lines of the input image is executed corresponding to the reduction rate of the image longitudinal direction.

$$MinLineCountY \le \frac{ScaleY\_Y}{100} \times InCount \quad \text{[Expression 20]}$$

For example, if ScaleY_Y=50%, a first line of the input image is InCount=0, and MinLineCountY=0. Thus, since the condition of Expression 20 above is met, the first line of the input image is a target to be reduced in size. Thus, one (1) is added to the value of the MinLineCountY. A second line is InCount=1, and MinLineCountY=1. Thus, the condition of Expression 20 above is not met, and thus the second line is not the target to be reduced in size. A third line is InCount=2, and MinLineCountY=1. Thus, since the condition of Expression 20 above is met, the third line is the target to be reduced in size. Thus, one (1) is added to the value of the MinLineCountY. The lines of the input image are extracted by this repetition.

If it is determined in S402 that the currently processing data is the data to be reduced in size, the processing proceeds to S403, and pixel data is extracted using the reduction rate ScaleY_X which is the luminance component in the image transverse direction stored (obtained in S304) in the size-reduced image information storage area 33. In detail, the pixel data corresponding to Expression 21 below is extracted as pixel data for the size-reduced image. Further, in Expression 21 below, MinPixCount is the pixel counter for the size-reduced image and InPixCount is the pixel counter for the original image. In other words, processing of extracting dots from the lines of the input image is executed corresponding to the reduction rate in the image transverse direction.

$$MinPixCountY \le \frac{ScaleY\_X}{100} \times InPixCount \quad \text{[Expression 21]}$$

Subsequently, in S404, the pixel data extracted in S403 is stored in the luminance component storage area (Y component storage area) in the size-reduced image data storage area 36. Afterwards, the size-reduced image generation processing is ended.

Meanwhile, if it is determined in S402 that the currently processing data is not the data to be reduced in size, the size-reduced image generation processing is ended.

Meanwhile, when it is determined that the type of the data currently processed in S401 as described above is the U data or the V data, the processing proceeds to S405, and it is determined whether or not the currently processing data (U data or V data) is the data to be small-sized. In detail, if the condition of Expression 22 described below is met, the data is determined to be reduced in size. Otherwise, the data is determined not to be reduced in size. Further, in Expression 22 below, ScaleCD_Y is the reduction rate of the chroma component in the image longitudinal direction stored (obtained in S304) in the size-reduced image information storage area 33, MinLineCountC is the line counter of the size-reduced image of the chroma components U and V, and InCount is the line counter of the input image. In other words, processing of extracting the lines of the input image is executed corresponding to the reduction rate in the image longitudinal direction.

$$MinLineCountC \le \frac{ScaleCD\_Y}{100} \times InCount \quad \text{[Expression 22]}$$

If it is determined in S405 that the currently processing data is the data to be reduced in size, the processing proceeds to S406, and pixel data is extracted using the reduction rate ScaleCD_X which is the chroma component in the image transverse direction stored in the size-reduced image information storage area 33 (obtained in S304). In detail, the pixel data corresponding to Expression 23 below is extracted as the pixel data for the size-reduced image. Further, in Expression 23 below, MinPixCount is the pixel counter of the size-reduced image, and InPixCount is the pixel counter of the original image. In other words, processing of extracting dots from the lines of the input image is executed corresponding to the reduction rate in the image transverse direction.

$$MinPixCountC \le \frac{ScaleCD\_X}{100} \times InPixCount \quad \text{[Expression 23]}$$

Subsequently, in S407, the pixel data extracted in S406 is stored in the chroma component storage area (U component storage area if being the U data, and V component storage area if being the V data) in the size-reduced image data storage area 36. After that, the size-reduced image generation processing is ended.

Meanwhile, if it is determined in S405 that the currently processing data is not the data to be reduced in size, the size-reduced image generation processing is ended.

[1-4. Effects]

Figure 10:
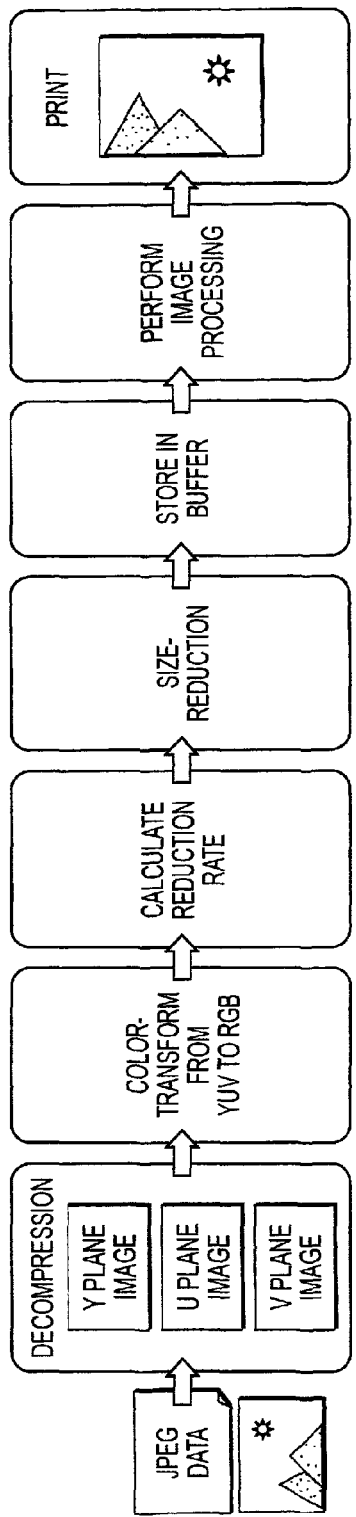
FIG. 10 is a view for explaining characteristics of size-reducing processing of exemplary embodiments of the present invention.
Figure 10:
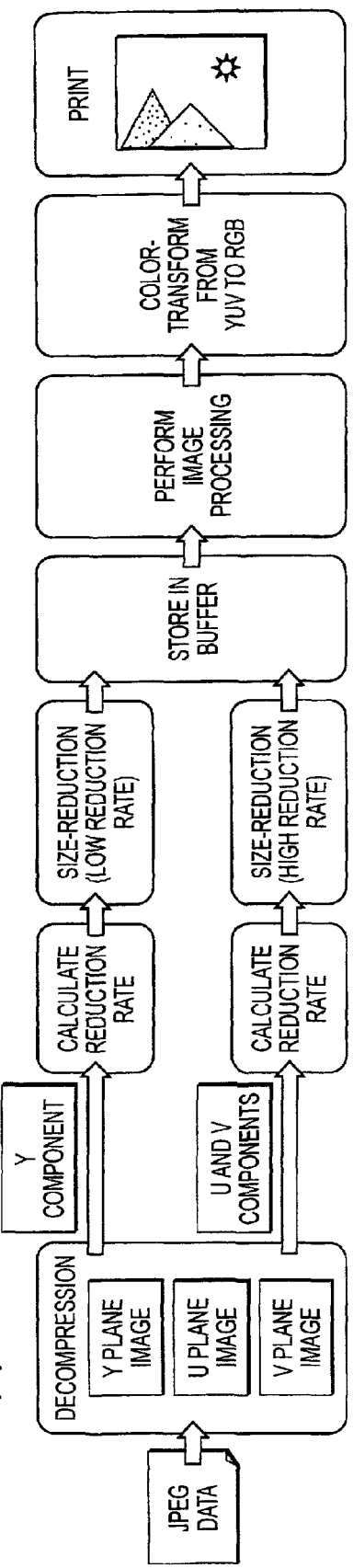

As described above, the combined machine 10 of the present embodiment reduces the size of the input image data required to perform the image processing (in the present embodiment, rotation processing) such that the size-reduction ratio of the chroma component is greater than that of the luminance component. That is, if any image processing is executed on the image data having the JPEG format, the related-art image processing is executed by color-transforming the decoded YUV data into RGB, reducing the sizes of all the planes of RGB at the same reduction rate, and temporarily storing the size-reduced planes in an internal buffer, as shown in FIG. 10(a). On the other hand, in the present embodiment, as shown in FIG. 10(b), the size of the image data is reduced at a different reduction rate such that among the decoded YUV data, the size-reduction ratio of the U and V components is greater than that of the Y component. Since the sense of sight of the human being is insensitive to a change in the chroma component compared to a change in the luminance component, the size of the image data is reduced as in the present embodiment, so that it is difficult for the user to easily perceive the degradation in the quality of image caused by reduction of the size of the image data. Further, in FIG. 10(b), the sequence of the color-transforming after the image processing is exemplified. However, the image processing and the color-transforming may be reversed.

Particularly, in the combined machine 10 of the present embodiment, if the size of the input image data required to perform the image processing is larger than that of the size-reduced image data storage area 36, the size of the input image data is reduced so as to be smaller than that of the size-reduced image data storage area 36. In detail, if the size of the input image data is larger than that of the size-reduced image data storage area 36, the input image data, the size of which is reduced, is stored in the size-reduced image data storage area 36. On the other hand, if the size of the input image data is smaller than that of the size-reduced image data storage area 36, the input image data is stored in the size-reduced image data storage area 36 without reducing the size thereof.

Thus, according to the combined machine 10 of the present embodiment, if the reduction of the size of the input image data is inevitable to perform the rotation processing, the input image data can be stored in the size-reduced image data storage area 36 by reducing the size of the input image data so as to make it difficult for the user to easily perceive the degradation in the quality of image caused by reduction of the size. Thus, it is possible to effectively use the size-reduced image data storage area 36 for performing the rotation processing on the input image data as well as making the degradation of image quality caused by the reduction of the size of the input image data uneasy to perceive.

Further, since the input image data is adapted to be reduced in size such that the size-reduction ratio of the luminance component is minimized within the limit that the ratio of the size-reduction ratio of the luminance component of the input image data to the size-reduction ratio of the chroma component of the input image data (i.e. the ratio of data sizes) does not exceed a predetermined maximum ratio (in this embodiment, 4:1), it is possible to reduce the size of the input image data such that the degradation of image quality is most unlikely to be noticed.

Second Exemplary Embodiment

Hereinafter, a second exemplary embodiment of the present invention will be described. The basic configuration is the same as in the first exemplary embodiment, and thus description to the common parts is omitted and the same reference numbers are used.

In the aforementioned combined machine 10 of the first exemplary embodiment, if the size of the input image data required to perform the image processing is larger than that of the size-reduced image data storage area 36, the size of the input image data is reduced so as to be smaller than that of the size-reduced image data storage area 36. The combined machine 10 of the second exemplary embodiment is different from that of the first exemplary embodiment in that the input image data is reduced in size to the utmost within a range where the degradation in image quality does not take place regardless of the size of the size-reduced image data storage area 36. Further, in the first exemplary embodiment, it is premised that the size-reduced image data storage area 36 is provided with the fixed size in advance. In contrast, in the second exemplary embodiment, it is premised that a desired size for the size-reduced image data storage area 36 is secured dynamically.

In detail, in the combined machine 10 of the second exemplary embodiment, the CPU 11 executes the print image output processing shown in FIG. 11, instead of the print image output processing (FIG. 8) described in the first exemplary embodiment. Further, since S501 through S503 and S508 through S519 in this print image output processing are equal to S301 through S303 and S305 through S316 in the print image output processing of FIG. 8, the description thereof will be omitted.

In S504, analysis processing of an input image is performed. In detail, the information about a header of input image data (image data compressed in the JPEG format) of a target to be printed, and horizontal and vertical sampling factors of each of Y, U, and V planes described in the SOF0 marker (0xFFC0) are read out and stored in the temporary variable storage area 39. That is, in the compression of the JPEG format, the image data is compressed such that a compression ratio of the chroma component is greater than that of the luminance component (e.g. a size ratio of the luminance component to the chroma component becomes 4:1). The ratio of the compression ratios is variable, and is described in the SOF0 marker (0xFFC0) of the header information as a combination of the horizontal and vertical sampling factors (value of 1 to 4). In the combined machine 10 of the second exemplary embodiment, as described below, since the image data after being decoded is adapted to be reduced in size such as to be equal to the compression ratio of the chroma component of the input image data when compressed (before being decoded) with respect to the compression ratio of the luminance component of the input image data when compressed (before being decoded), the ratio of the compression ratios is read out in the processing of S504.

Sequentially, in S505, a reduction rate of each of the luminance component Y and the chroma components U and V is calculated from the horizontal and vertical sampling factors of each of the Y, U, and V planes, which are read out in S504.

In this embodiment, both ScaleY_X that is the reduction rate (%) of the luminance component in the image transverse direction relative to the original image and ScaleY_Y that is the reduction rate (%) of the luminance component in the image longitudinal direction relative to the original image are 100%.

Further, ScaleCD_X that is the reduction rate (%) of the chroma component in the image transverse direction relative to the original image and ScaleCD_Y that is the reduction rate (%) of the chroma component in the image longitudinal direction relative to the original image are expressed below in Expressions 24 and 25.

$$\text{ScaleCD\_X} = \frac{CDSampleFactH}{YSampleFactH} \times \text{ScaleY\_X} \quad \text{[Expression 24]}$$

$$\text{ScaleCD\_Y} = \frac{CDSampleFactV}{YSampleFactV} \times \text{ScaleY\_Y} \quad \text{[Expression 25]}$$

YSampleFactH is the horizontal sampling factor of the luminance component Y, YSampleFactV is the vertical sampling factor of the luminance component Y, CDSampleFactH is the horizontal sampling factor of the chroma component U or V, and CDSampleFactV is the vertical sampling factor of the chroma component U or V.

Further, the image transverse and longitudinal reduction rates ScaleY_X, ScaleY_Y, ScaleCD_X, and ScaleCD_Y of the luminance component and the chroma component which are decided in the processing of S505 are stored in the respective areas of the size-reduced image information storage area 33 (the luminance component transverse reduction rate storage area 71, the luminance component longitudinal reduction rate storage area 72, the chroma component transverse reduction rate storage area 73, and the chroma component longitudinal reduction rate storage area 74), and the other calculating variables are stored in the temporary variable storage area 39.

Sequentially, in S506, a size (acquired buffer size) of the size-reduced image information storage area 33 which must be secured is calculated on the basis of the reduction rates calculated in S505. In detail, the acquired buffer size, RotBuffSize, is expressed below in Expressions 26 through 28 using the ScaleY_X, ScaleY_Y, ScaleCD_X, and ScaleCD_Y calculated in S505.

$$ScaleY = (\text{ScaleY\_X}/100) \times (\text{ScaleY\_Y}/100) \times 100 \quad \text{[Expression 26]}$$

$$ScaleCD = (\text{ScaleCD\_X}/100) \times (\text{ScaleCD\_Y}/100) \times 100 \quad \text{[Expression 27]}$$

$$RotBuffSize = \left(\frac{ScaleY}{100} \times Xin \times Yin\right) + 2 \times \left(\frac{ScaleCD}{100} \times Xin \times Yin\right) \quad \text{[Expression 28]}$$

Sequentially, in S507, the size-reduced image information storage area 33 having the size calculated in S506 is secured.

As described above, in the combined machine 10 of the second exemplary embodiment, a size-reduction ratio of the chroma component of the input image data is decided with respect to that of the luminance component of the input image data such as to be identical with the compression ratio of the chroma component of the input image data before being decoded with respect to the compression ratio of the luminance component of the input image data before being decoded, and the input image data is reduced in size based on the decided size-reduction ratio. In detail, only the chroma component of the input image data is reduced in size without reducing the size of the luminance component of the input image data.

Thus, according to the combined machine 10 of the second exemplary embodiment, the chroma component is reduced in size within a range where the chroma component has already been degraded by the compressed state before being decoded, so that the input image data can be reduced in size to the utmost without incurring new degradation in image quality. Accordingly, the size-reduced image data storage area 36 for performing the rotation processing on the input image data can be made to the minimum size within the range where no degradation in image quality occurs, and the storage area of the inner memory 13 can be effectively used for other processing.

Additional Modifications

Although the exemplary embodiments of the present invention have been described, the present invention is not intended to cover only these exemplary embodiments, but also various alternatives, modifications, equivalents and other embodiments.

For example, in the aforementioned exemplary embodiments, the nearest neighbor method is exemplified as an algorithm for size-reduction and size-enlargement processing. However, without being limited to the nearest neighbor method, another algorithm (e.g. a bi-linear method, a bi-cubic method, an area average method, etc.) may be used. In this case, similar effects can be obtained. According to the used algorithm, it is necessary to modify configuration, for instance to increase the storage area used for the size-reduction and size-enlargement processing.

Further, in the exemplary embodiments, the rotation processing is exemplified as the image processing performed on the image data. However, without being limited to the rotation processing, similar effects can be obtained by other kinds of image processing such as filter processing, transform processing, recognition processing, etc.

Moreover, in the exemplary embodiments, the JPEG format is exemplified as an image compression format capable of performing compression such that the compression ratio of the chroma component is greater than that of the luminance component. However, the image compression format is not limited to the JPEG format. For example, similar effects as the exemplary embodiments described with the JPEG format can be obtained by using other formats such as a TIFT format, JPEG2000 format, a JPEGXR format, etc., because they also have data corresponding to the horizontal and vertical sampling factors.

Meanwhile, in the exemplary embodiments, the YUV color spaces are exemplified as color spaces that can be separated into the luminance component and the chroma component. However, the color spaces are not limited to the YUV color spaces, and similar effects can be obtained by LAB color spaces or HSV color spaces.

Further, the features of the first and second exemplary embodiments may be combined. For example, the size of the input image data may not be reduced as in the first exemplary embodiment where the size of the input image data required to perform the rotation processing is smaller than the size of the size-reduced image data storage area 36, and only the chroma component of the input image data may be reduced in size such as to be equal to the compression ratio before being decoded as in the second exemplary embodiment where the size of the input image data is greater than the size of the size-reduced image data storage area 36. In contrast, as long as the desired size for the size-reduced image data storage area 36 can be secured, only the chroma component of the input image data may be reduced in size such as to be identical to the compression ratio before being decoded as in the second exemplary embodiment, and the luminance component may be reduced in size while maintaining the ratio of the size-reduction ratios such that the size of the input image data is smaller than the size of the size-reduced image data storage area 36 as in the first exemplary embodiment where the desired size cannot be secured.

Furthermore, in the exemplary embodiments, the configuration where the present invention is applied to the combined machine 10 capable of printing the color image using CMYK inks is exemplified. However, the present invention is not limited to this configuration. For example, the present invention may be applied to printing machines other than the inkjet mode printing machine, or printing machines (e.g. without a scanner function) other than the combined machine, and so on. Further, the present invention may be applied to machines that print no image. If the image processing apparatus performs the image processing on the image data stored in the temporary storage area, the present invention may be applied to the image processing apparatus.

The invention claimed is:

1. An image processing apparatus, comprising:
   a temporary storage area;
   a processor; and
   a memory configured to store computer readable instructions that, when executed by the processor, instruct the processor to perform processes comprising:
      generating, if a size of the temporary storage area is less than a size of original image data, size-reduced image data by reducing the size of the original image data, the size of the original image data being reduced such that a size-reduction ratio of a chroma component is greater than a size-reduction ratio of a luminance component, and the reducing comprising:
         reducing the size of the chroma component without reducing the size of the luminance component if a size of the temporary storage area is less than the size of original image data and greater than a predetermined data size, the predetermined data size being related to and less than the size of original image data, and
         reducing both the size of the chroma component and the size of the luminance component if the size of the temporary storage area is less than the predetermined data size;
      storing the size-reduced image data in the temporary storage area if the size of the temporary storage area is less than the size of the original image data; and
      storing the original image data in the temporary storage area if the size of the temporary storage area is greater than the size of the original image data.

2. The image processing apparatus according to claim 1, wherein the computer readable instructions, when executed by the processor, further instruct the processor to perform a process of reducing the size of the original image data, such that the size-reduction ratio of the luminance component of the image data is minimized within a limit, and such that a ratio of the size-reduction ratio of the luminance component to the size-reduction ratio of the chroma component does not exceed a predetermined maximum ratio.

3. The image processing apparatus according to claim 1, wherein the predetermined data size is half of the size of the original image data.

4. The image processing apparatus according to claim 1, wherein reducing both the size of the chroma component and the size of the luminance component if the size of the temporary storage area is less than the predetermined data size comprises:
   reducing the size of the original image data such that a ratio between the size of the luminance component after the reducing and the size of the chroma component after the reducing is a predetermined ratio.

5. The image processing apparatus according to claim 4, wherein said ratio between a size of the luminance component after the reducing and a size of the chroma component after the reducing is 2:1.

6. The image processing apparatus according to claim 1, wherein reducing the size of the chroma component without reducing the size of the luminance component if a size of the temporary storage area is less than the size of original image data and greater than the predetermined data size comprises:
   reducing the size of the original image data such that a sum of the size of the luminance component, which is not size-reduced, and the size of the chroma component after the reducing is equal to the size of the temporary storage area.

7. The image processing apparatus according to claim 6, wherein reducing the size of the original image data such that a sum of the size of the luminance component, which is not size-reduced, and the size of the chroma component after the reducing is equal to the size of the temporary storage area comprises: reducing the size of the original image data such that a ratio of the size of the luminance component, which is not size-reduced, to the size of the chroma component after the reducing is less than or equal to a predetermined ratio.

8. The image processing apparatus according to claim, 7, wherein said ratio of the luminance component, which is not size-reduced, to the size of the chroma component after the reducing is less than or equal to 2.

9. The image processing apparatus according to claim 1, wherein reducing the size of the original image data comprises: reducing the size of the original image data such that the size-reduction ratio of the luminance component of the size-reduced image data is minimized within a limit that a ratio of the size-reduction ratio of the luminance component to the size-reduction ratio of the chroma component does not exceed a predetermined maximum ratio.

10. An image processing apparatus, comprising:
   a temporary storage area;
   a processor; and
   a memory configured to store computer readable instructions that, when executed by the processor, instruct the processor to perform processes comprising:
      generating size-reduced image data by reducing the size of the original image data size of the original image data being reduced such that a size-reduction ratio of a chroma component is greater than a size-reduction ratio of a luminance component, and the reducing comprising:
         reducing the size of the chroma component without reducing the size of the ance co ent if a size of the temporary storage area is greater than a predetermined data size, the predetermined data size being related to and less than the size of original image data, and
         reducing both the size of the chroma component and the size of the luminance component if the size of the temporary storage area is less than the predetermined data size;
      storing the size-reduced image data in the temporary storage area,
   wherein the original image data is generated by decompressing compressed data of an image compression format, such that a compression ratio of the chroma component of the original image data is greater than a compression ratio of the luminance component of the original image data,
   wherein a ratio of the size-reduction ratio of the chroma component to the size-reduction ratio of the luminance component is equal to a ratio of a compression ratio of the chroma component of the original image data before decompression to a compression ratio of the luminance component of the original image data before decompression, and wherein the computer readable instructions, when executed by the processor, further instruct the processor to perform a process of reducing the size of the original image data based on the ratio of the size-reduction ratio of the chroma component to the size-reduction ratio of the luminance component.

11. The image processing apparatus according to claim 10, wherein the predetermined data size is half of the size of the original image data.

12. The image processing apparatus according to claim 10, wherein reducing both the size of the chroma component and the size of the luminance component if the size of the temporary storage area is less than the predetermined data size comprises:

reducing the size of the original image data such that a ratio between the size of the luminance component after the reducing and the size of the chroma component after the reducing is a predetermined ratio.

13. The image processing apparatus according to claim 12, wherein said ratio between a size of the luminance component after the reducing and a size of the chroma component after the reducing is 2:1.

14. The image processing apparatus according to claim 10, wherein reducing the size of the chroma co ent without reducin he size of the luminance component if a size of the temporary storage area is greater than a predetermined data size comprises:

reducing the size of the original image data such that a sum of the size of the luminance component, which is not size-reduced, and the size of the chroma component after the reducing is equal to the size of the temporary storage area.

15. The image processing apparatus according to claim 14, wherein reducing the size of the original image data such that a sum of the size of the luminance component, which is not size-reduced, and the size of the chroma component after the reducing is equal to the size of the temporary storage area comprises: reducing the size of the original image data such that a ratio of the size of the luminance component, which is not size-reduced, to the size of the chroma component after the reducing is less than or equal to a predetermined ratio, 16. The image processing apparatus according to claim 15, wherein said ratio of the luminance component, which is not size-reduced, to the size of the chroma component after the reducing is less than or equal to 2.

17. The image processing apparatus according to claim 10, wherein reducing the size of the original image data comprises:

reducing the size of the original image data such that the size-reduction ratio of the luminance component of the size-reduced image data is minimized within a limit that a ratio of the size-reduction ratio of the luminance component to the size-reduction ratio of the chroma component does not exceed a predetermined maximum ratio.

18. A non-transitory computer readable recording medium storing computer readable instructions that, when executed by a processor of an image processing apparatus, instruct the processor to perform processes comprising:

generating, if a size of a temporary storage area is less than a size of original image data, size-reduced image data by reducing the size of original image data, the size of the original image data being reduced such that a size-reduction ratio of a chroma component is greater than a size-reduction ratio of a luminance component, and the reducing comprising:

reducing the size of the chroma component without reducing the size of the luminance component if a size of the temporary storage area is less than the size of original image data and greater than a predetermined data size, the predetermined data size being related to and less than the size of original image data, and reducing both the size of the chroma component and the size of the luminance component if the size of the temporary storage area is less than the predetermined data size;

storing the size-reduced image data in the temporary storage area if the size of the temporary storage area is less than the size of the original image data; and storing the original image data in the temporary storage area if the size of the temporary storage area is greater than the size of the original image data.

* * * * *